A. H. KNAPP.
CURTAIN-FIXTURES.
No. 6,925. Reissued Feb. 15, 1876.
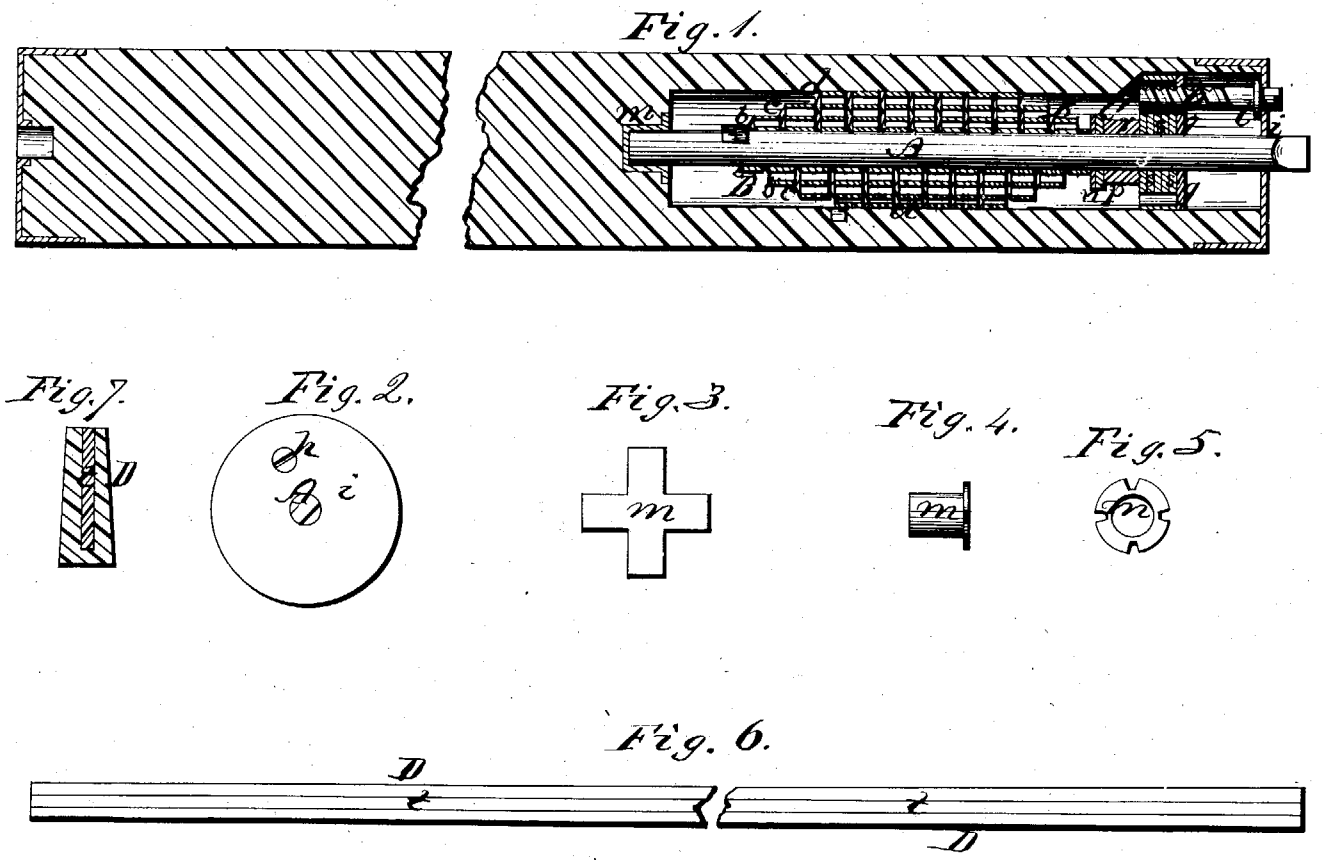
WITNESSES
E. McGallaher.
F. B. Townsend.
INVENTOR
A. Hayden Knapp,
By J. S. Brown, his Attorney

UNITED STATES PATENT OFFICE.

A. HAYDN KNAPP, OF NEWTON, MASSACHUSETTS.

IMPROVEMENT IN CURTAIN-FIXTURES.

Specification forming part of Letters Patent No. 118,725, dated September 5, 1871; reissue No. 6,925, dated February 15, 1876; application filed May 25, 1875.

*To all whom it may concern:*

Be it known that I, A. HAYDN KNAPP, of Newton, in the county of Middlesex and State of Massachusetts, have invented certain Improvements in Curtain-Fixtures; and I do hereby declare that the following is a full and exact description thereof, reference being had to the accompanying drawings making part of this specification—

Figure 1 being a central longitudinal section of a curtain-roller provided with improvements according to my invention; Fig. 2, an end view of the same; Figs. 3, 4, and 5, different views of a part detached; Fig. 6, a top-edge view of the lead-weighted shade-stick, constructed according to my invention; Fig. 7, a transverse section of the same.

Like letters designate corresponding parts in all of the figures.

Let A represent the shaft or spindle on which one end of the roller turns, and to which the winding-spring B of the fixture has its fixed attachment, the flattened or angular projecting end of the shaft resting in a notch of the bracket, to hold it stationary while the the spring coils and uncoils, and the roller turns thereon.

The spring B which I use in this fixture is composed of several redoublings or layers, *a b c d*, one within or concentric with another, and all formed or connected together so as to compose one spring, such as claimed in a previous patent of the United States granted to me. My present improvement in the spring consists in making the redoublings or layers *a b c d* of the same successively shorter from the inner to the outer, preferably about as shown in Fig. 1, that is, each preceding outer layer being one coil shorter at each end than the next succeeding inner layer. This construction gives greater steadiness to the spring, and greater uniformity to its action. It also keeps the spring in position better, and enables the following device to be more conveniently applied:

At the outer end of the spring B is located an elastic washer or brake, C, to bear against the end of the said spring with an adjustable force, in order to restrain and control the spring after the shade is raised or lowered, and prevent its drawing the same out of position if too strong, or letting it down too low if too weak to fully sustain the same. This brake is centered upon the shaft or spindle A, on which it slides. It has a metallic holder or case, *g*, at its outer end, and a washer, or two washers, *n p*, one of pasteboard, leather, or other comparatively soft or frictional material, for the end of the inner layer *a* of the spring to bear against, and the other a metallic washer, next to the former, to give strength and firmness. Between the said washers or disks and the holder *g* is a block, *r*, of india-rubber, or equivalent spring; and there may be washers or disks, *s s*, between the elastic block and the holder for adjusting the thickness of the brake. A screw, *h*, turns in one side of the holder *g*, which has a screw-thread to receive it. The screw extends out through a hole in the end *i* of the ferrule of the fixture far enough to be reached by a screw-driver. An enlargement or shoulder, *l*, on the screw, just inside of the ferrule, prevents the screw from being driven out through the same. By turning the screw one way, the brake C is driven inward, and bears with increased force and friction against the spring B; and by turning it the other way, the force and friction are diminished; and thus the action of the brake is easily adjusted. The spring is fastened at the inner end, so that it cannot slide endwise on the spindle. Two adjusting-screws might be employed respectively on opposite sides of the spindle; but one serves the purpose, and is more simple and convenient than two.

The spring B and brake C operate together, so as effectually to overcome a difficulty in working all balance-spring fixtures, namely, that the spring is not the same in its action when the shade is nearly wound up as when drawn down, being generally strongest in proportion when the shade is drawn down. But by the present improvement, when the shade is drawn down, and the spring therefore is coiled most forcibly, the increased tension of the spring, pressing inward, operates to spread and lengthen the inner layer *a* thereof especially, and thereby to cause it to press with more force and friction against the brake, and vice versa. Thus the difficulty is fully obviated, and the shade works uniformly throughout its winding. The brake also enables the spring to be kept at somewhat excessive tension, so that it never fails to carry up the shade automatically.

The inner bush or lining *m* of the shaft or spindle A is cheaply and easily made of sheet-metal, which is first cut into the form of a cross, as in Fig. 3, and then stamped by dies into the cup-shaped form represented in Figs. 4 and 5.

In Figs. 6 and 7 is shown my improved construction of the shade-stick for leading, or weighting with other heavy material, to hold the shade in position, when not in motion, against the force of the spring B. The stick D has a deep groove cut in its upper edge, nearly through to the other edge, leaving, however, enough thickness of wood to keep it from splitting. This groove is of the proper thickness to just receive the thickness of the strip *t* of lead, and deep enough, or nearly so, for the width of the lead strip which is placed therein, and remains secure, without liability to work out of place. The construction is simple and cheap, and the loaded stick is neat and compact.

What I claim as my invention, and desire to secure by Letters Patent, is—

1. The spring B, attached at one end to the spindle and at the other end to the roller of a curtain-fixture, and formed of redoublings or layers *a b c d*, the next outer being successively shorter than the adjacent inner layer, as and for the purpose herein specified.

2. The elastic friction-brake C, composed of disks or washers, substantially as described, and provided with an adjusting-screw, *h*, in combination with a spring, B, pressing against the brake, substantially as and for the purpose herein specified.

3. The shade-stick D, grooved in its upper edge to receive and hold the lead or other weighting strip *t*, substantially as herein specified.

Specification signed by me this 17th day of May, 1875.

A. H. KNAPP.

Witnesses:
H. W. KITTREDGE,
GEO. N. MARCH.